(12) United States Patent
Bochiechio et al.

(10) Patent No.: US 8,240,999 B2
(45) Date of Patent: Aug. 14, 2012

(54) INTERNALLY SUPPORTED AIRFOIL AND METHOD FOR INTERNALLY SUPPORTING A HOLLOW AIRFOIL DURING MANUFACTURING

(75) Inventors: Mario P. Bochiechio, Vernon, CT (US); Thomas J. Watson, South Windsor, CT (US); Wangen Lin, South Glastonbury, CT (US); John Joseph Marcin, Marlborough, CT (US); Joseph Parkos, Jr., East Haddam, CT (US)

(73) Assignee: United Technologies Corporation, Hartford, CT (US)

( * ) Notice: Subject to any disclaimer, the term of this patent is extended or adjusted under 35 U.S.C. 154(b) by 795 days.

(21) Appl. No.: 12/415,307

(22) Filed: Mar. 31, 2009

(65) Prior Publication Data

US 2010/0247322 A1    Sep. 30, 2010

(51) Int. Cl.
| | |
|---|---|
| *B63H 1/26* | (2006.01) |
| *B63H 7/02* | (2006.01) |
| *B64C 11/16* | (2006.01) |
| *F01D 5/14* | (2006.01) |
| *F03B 7/00* | (2006.01) |
| *F03D 11/02* | (2006.01) |
| *F04D 29/38* | (2006.01) |

(52) U.S. Cl. .................................................. 416/223 A
(58) Field of Classification Search ........... 416/232–233
See application file for complete search history.

(56) References Cited

U.S. PATENT DOCUMENTS

| | | |
|---|---|---|
| 2,326,430 A | 8/1943 | Blanchard |
| 6,158,957 A | 12/2000 | Marcin et al. |
| 7,070,391 B2 | 7/2006 | Weisse |
| 7,172,012 B1 | 2/2007 | Memmen |
| 7,240,821 B2 | 7/2007 | Talwar |

(Continued)

FOREIGN PATENT DOCUMENTS

DE        102007023151        11/2008

(Continued)

*Primary Examiner* — Ha Tran T Nguyen
*Assistant Examiner* — Valerie N Brown
(74) *Attorney, Agent, or Firm* — O'Shea Getz P.C.

(57) ABSTRACT

A hollow airfoil and a method for manufacturing a hollow airfoil is provided. The method includes the steps of: providing a first airfoil portion, which first portion has a wall with an interior surface and an exterior surface, and one or more ribs extending out from the interior surface; providing a second airfoil portion having a wall with an interior surface and an exterior surface; wherein the first airfoil portion and the second airfoil portion have mating geometries in which the one or more ribs extend between the interior surfaces of the walls of the first and second airfoil portion to form at least one internal cavity defined by the interior surface of the first portion wall, one or more of the ribs, and the interior surface of the second portion wall, and wherein the airfoil includes at least one exterior port disposed in one of the first airfoil portion or the second airfoil portion, or is formed between the first and second airfoil portions, which at least one exterior port is in fluid communication with the at least one cavity; disposing a support material within the at least one internal cavity allowing the support material to be in contact with the one or more ribs, which support material is operative to structurally support the one or more ribs; attaching the first and second airfoil portions together; and removing the support material from the at least one internal cavity through the at least one exterior port.

13 Claims, 4 Drawing Sheets

U.S. PATENT DOCUMENTS

| | | |
|---|---|---|
| 7,334,333 B2 * | 2/2008 | Palazzini et al. ......... 29/889.721 |
| 7,438,527 B2 | 10/2008 | Albert et al. |
| 7,464,852 B2 | 12/2008 | Waldron et al. |
| 2003/0075300 A1 | 4/2003 | Shah et al. |
| 2004/0020629 A1 | 2/2004 | Shah et al. |
| 2005/0121167 A1 | 6/2005 | Marcin, Jr. et al. |
| 2005/0211408 A1 | 9/2005 | Bullied et al. |
| 2005/0244955 A1 | 11/2005 | Li et al. |
| 2005/0274482 A1 | 12/2005 | Marcin, Jr. et al. |
| 2006/0021730 A1 * | 2/2006 | Marcin, Jr. ................. 164/122.1 |
| 2007/0074839 A1 | 4/2007 | Turkington et al. |
| 2007/0095501 A1 | 5/2007 | Beals et al. |
| 2008/0011445 A1 | 1/2008 | Beals et al. |
| 2008/0169270 A1 | 7/2008 | Parkos et al. |
| 2008/0308610 A1 | 12/2008 | Watson et al. |
| 2008/0311421 A1 | 12/2008 | Watson et al. |

FOREIGN PATENT DOCUMENTS

| | | |
|---|---|---|
| JP | 10230375 | 9/1998 |

* cited by examiner

INTERNALLY SUPPORTED AIRFOIL AND METHOD FOR INTERNALLY SUPPORTING A HOLLOW AIRFOIL DURING MANUFACTURING

BACKGROUND OF THE INVENTION

1. Technical Field

This disclosure relates to methods and apparatus for manufacturing hollow airfoils generally, and more particularly to a method and apparatus for providing support within an internal cavity of the airfoil during the manufacturing process.

2. Background Information

A gas turbine engine includes a fan section, a compressor section, a combustor and a turbine section disposed along an axially extending centerline. The fan section includes a plurality of rotor assemblies rotatable about the centerline, and at least one stator assembly. Each rotor assembly has a rotor disk and plurality of fan blades extending radially out from the disk. The fan blades are disposed within a gas path where they are operable to transfer energy to air passing therethrough, thus producing useful thrust. Each fan blade has an airfoil portion, and in most instances an inner platform as well. Fan blades that can be selectively mounted on the disk include a base (sometimes referred to as a "root") that engages the disk for attachment purposes.

Some gas turbine fan blades (typically referred to as a "hollow fan blade") have an internal cavity disposed within the airfoil section, which cavity is formed between a pressure side wall and a suction side wall, and a plurality of ribs extending between the walls. Typically, hollow fan blades are manufactured by joining a first portion of the airfoil together with a second portion of the airfoil. Welding is a known method of attachment. One of the problems associated with welding is that the airfoil portions can distort during the process and create misalignments between mating portions, thereby making it difficult to properly join the portions. This is particularly problematic in those instances where the mating parts cannot be visually inspected.

SUMMARY OF THE INVENTION

According to an aspect of the present invention, a method for manufacturing a hollow airfoil is provided, including the steps of: a) providing a first airfoil portion, which first portion has a wall with an interior surface and an exterior surface, and one or more ribs extending out from the interior surface; b) providing a second airfoil portion having a wall with an interior surface and an exterior surface, wherein the first and second airfoil portions have mating geometries in which the one or more ribs extend between the interior surfaces of the walls of the first and second airfoil portions to form at least one internal cavity, and wherein the hollow airfoil includes at least one exterior port disposed in one of the first airfoil portion or the second airfoil portion, or is formed between the first and second airfoil portions, which at least one exterior port is in fluid communication with the at least one cavity; c) disposing a support material within the at least one of the internal cavity allowing the support material to be in contact with the one or more ribs, which support material is operative to structurally support the one or more ribs; d) attaching the first and second airfoil portions together; and e) removing the support material from the at least one internal cavity through the at least one exterior port.

According to another aspect of the invention a hollow airfoil is provided. The airfoil includes a first airfoil portion, a second airfoil portion, and a support material. The first airfoil portion has a wall with an interior surface and an exterior surface, and one or more ribs extending out from the interior surface. The second airfoil portion has a wall with an interior surface and an exterior surface, and is attached to the first airfoil portion. The first and second airfoil portions have mating geometries in which the one or more ribs extend between the interior surfaces of the walls of the first and second airfoil portion to faun at least one internal cavity defined by the interior surface of the first portion wall, one or more of the ribs, and the interior surface of the second portion wall. The airfoil includes at least one exterior port disposed in one of the first airfoil portion or the second airfoil portion, or is formed between the first and second airfoil portions, which at least one exterior port is in fluid communication with the at least one cavity. The support material is disposed within the at least one internal cavity in contact with the one or more ribs. The support material is operative to structurally support the one or more ribs.

DETAILED DESCRIPTION OF THE INVENTION

Figure 1:
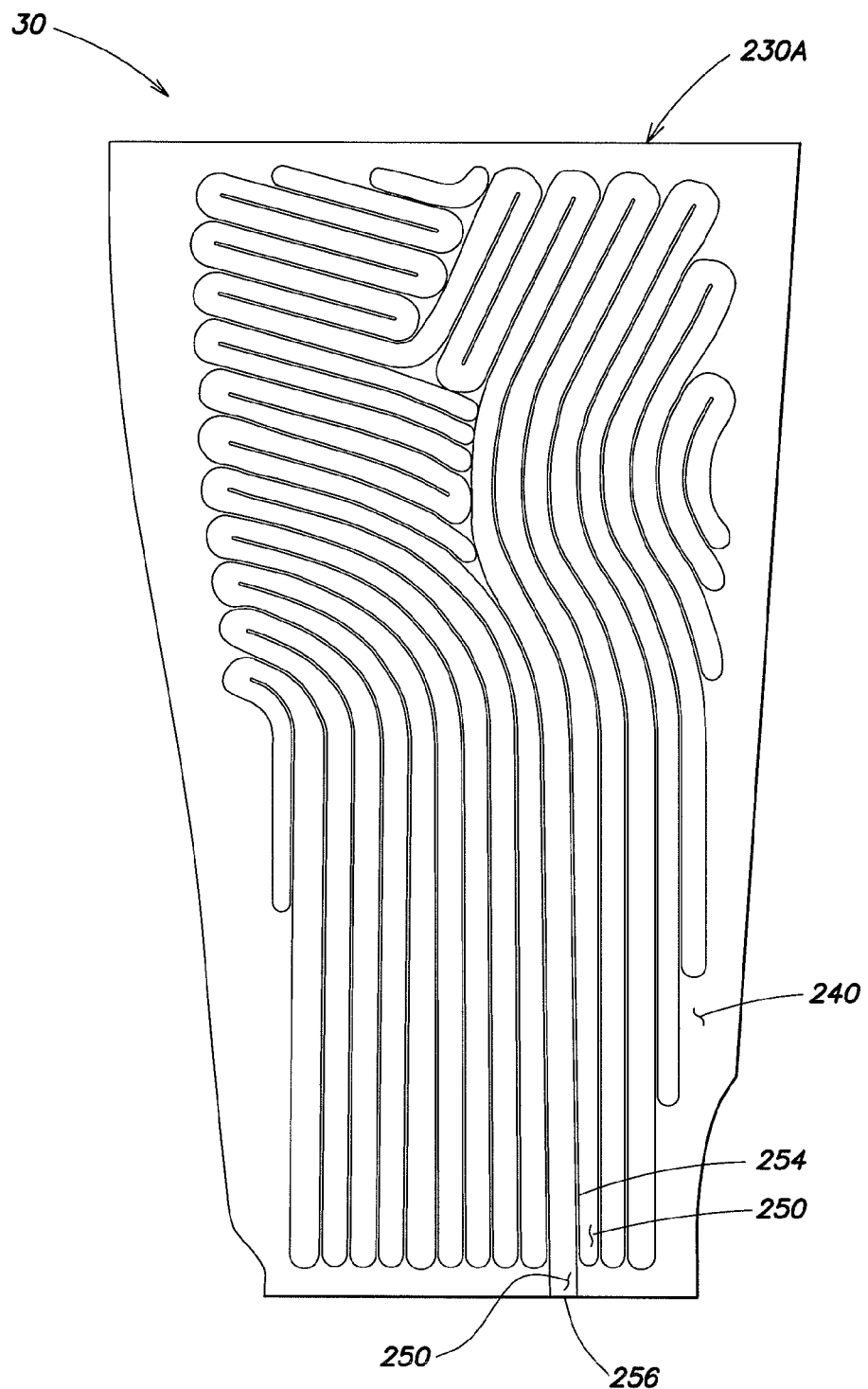
FIG. 1 is a diagrammatic representation of a first airfoil portion.
Figure 2:
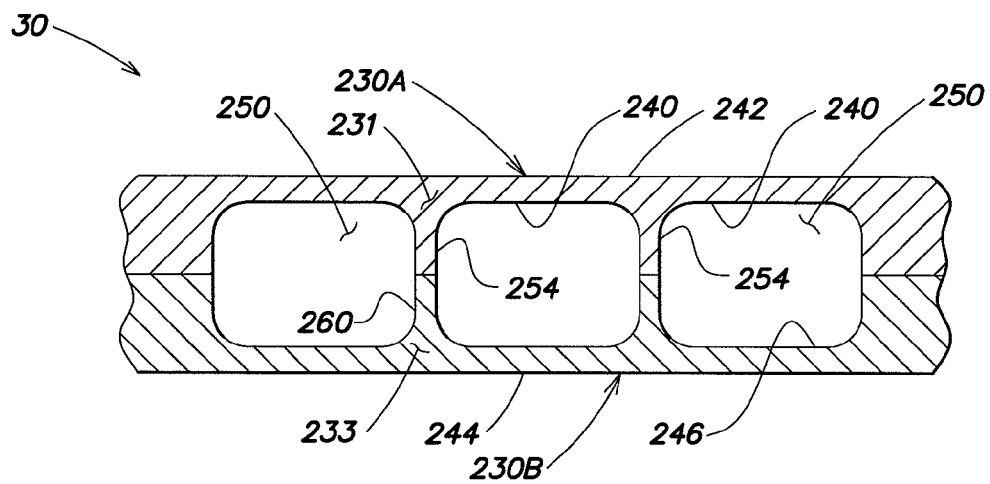
FIG. 2 is a diagrammatic cross-sectioned partial view of first and second airfoil portions joined together.
Figure 3:
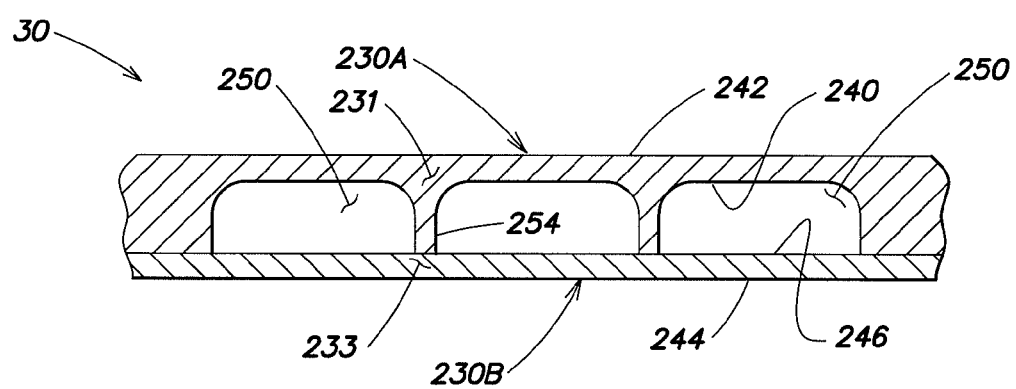
FIG. 3 is another diagrammatic cross-sectioned partial view of first and second airfoil portions joined together.

Referring to FIGS. 1-3, a hollow airfoil 30 includes a first airfoil portion 230A and a second airfoil portion 230B, and at least one internal cavity 250. The first and second airfoil portions 230A, 230B may be formed from a material such as, but not limited to, aluminum, an aluminum alloy, and all other weldable alloy systems. The first airfoil portion 230A has a wall 231 defined by an exterior surface 242 and an interior surface 240, and one or more ribs 254 extending out from the interior surface 240. The second airfoil portion 230B has a wall 233 defined by an exterior surface 244 and an interior surface 246. FIG. 2 illustrates an example of a second airfoil portion 230B having one or more ribs 260 extending out from the interior surface 246. FIG. 3 illustrates an example wherein the ribs 254 extending out from the interior surface 240 of the first airfoil portion 230A extend across to the interior surface 246 of the second airfoil portion 230B. In this example, the second airfoil portion 230B is configured as a substantially flat panel. The first and second airfoil portions 230A, 230B may have any combinations of ribs extending out from one or the other, or from both. The at least one internal cavity 250 is defined by the interior surface 240 of the first portion wall 230A, one or more of the ribs 254, 260, and the interior surface 246 of the second portion wall 230B. The diagrammatic examples shown in FIGS. 2 and 3 include a plurality of internal cavities 250.

The airfoil 30 includes at least one exterior port 256 (see FIG. 1) extending between the at least one internal cavity 250 and the exterior of the hollow airfoil 30. The exterior port 256 provides fluid communication between the internal cavity 250 and the exterior of the hollow airfoil as will be explained below. In those embodiments having more than one internal cavity 250, which internal cavities 250 receive a support material 600 as is described below, all of such internal cavities 250 are in fluid communication with at least one exterior port 256.

Figure 4:
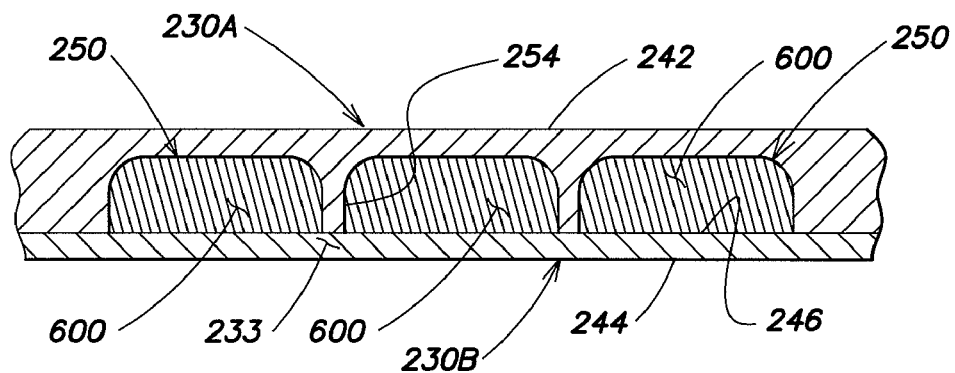
FIG. 4 is a diagrammatic cross-sectioned partial view shown in FIG. 3, filled with a support material.

The support material 600 (illustrated in FIG. 4) may be any material that: a) can be disposed within the at least one internal cavity 250; b) provides sufficient support for a structural member (e.g., a rib 254) of the first and/or second airfoil portions 230A, 230B to facilitate preventing substantial deformation of the member during the process of attaching the first and second airfoil portions 230A, 230B together; and c) may be removed from the at least one internal cavity through the exterior port 256 after the airfoil portions 230A, 230B are attached together. The specific properties of the support material 600 may vary depending upon the material of the airfoil portions and/or the attachment process (e.g., friction stir welding). An example of an acceptable support material 600 is a ceramic material (e.g., fused silica, alumina, silica-alumino silicate, etc.) used in conjunction with a binder (e.g., wax, phenolic urethane, etc.). These binder systems may be removed through the airfoil 30 by acid erosion or through thermal cycling of the welded component. Another example of an acceptable support material 600 is a low melt metallic alloy that can be removed by thermal liquification. It should be noted that these are examples of acceptable support materials, and the exemplary method is not limited to these materials. The amount of support material 600 disposed within the internal cavity 250 is dictated by the amount of support needed by the airfoil member, and the amount of support provided by the support material 600. In FIG. 4, the internal cavities 250 are shown filled with support material 600. In other applications, it may be possible to use an amount of support material 600 that does not fill the internal cavities 250.

Figure 5:
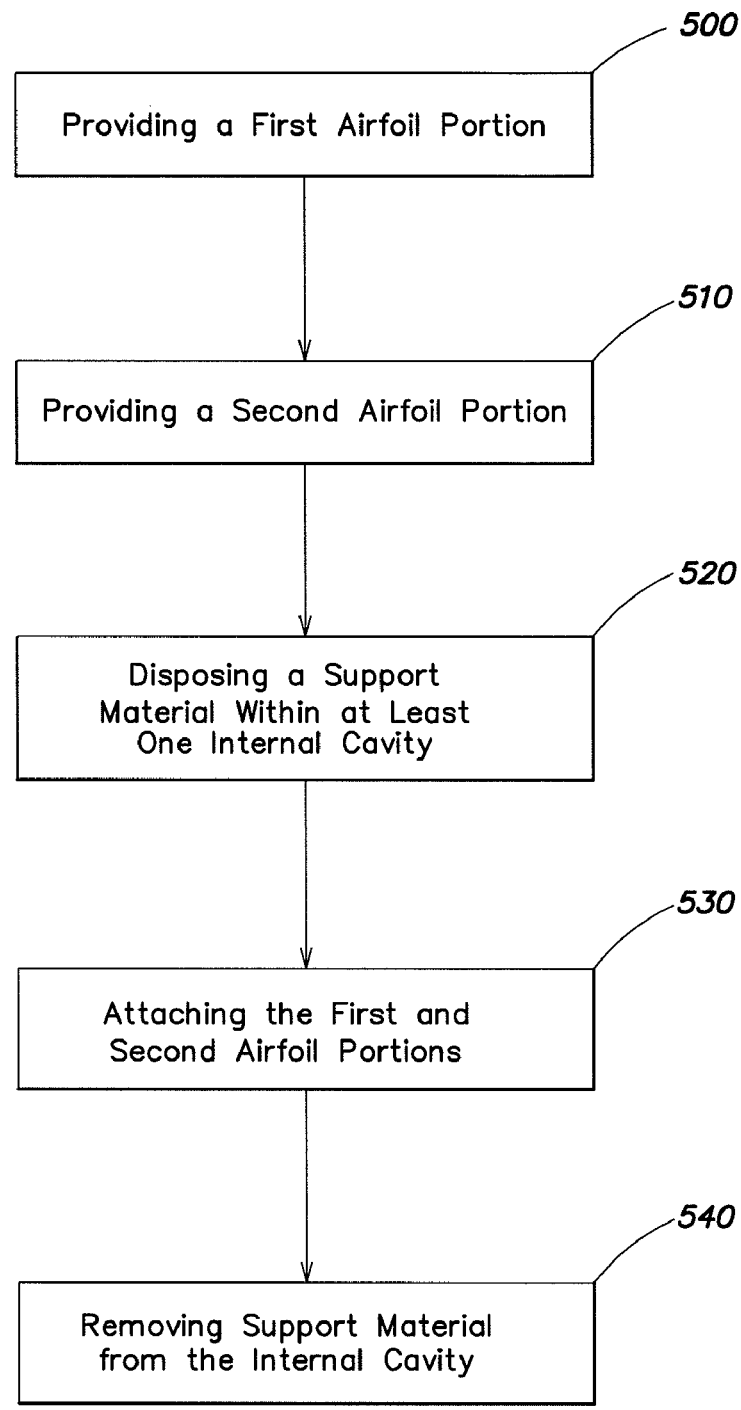
FIG. 5 is a flow diagram illustrating the present method.

Now referring to FIG. 5, a flow diagram is provided illustrating an example of the exemplary method. Each block represents a step of the method. The order of the steps is not fixed and the steps may be performed in a variety of different orders. Blocks 500 and 510 represent providing the first airfoil portion 230A and providing the second airfoil portion 230B. Block 520 represents the step of disposing a support material within the at least one internal cavity in a position to permit the support material to structurally support the one or more ribs. Block 530 represents attaching the first and second airfoil portions 230A, 230B to one another, for example using a welding or other bonding process. An example of a bonding process that is acceptable for joining first and second airfoil portions 230A, 230B including an aluminum alloy is friction stir welding. The exemplary method implements support material to facilitate, for example, a) joining the airfoil portions together along interfaces that cannot be visually inspected during the joining process; b) decreasing the deformation of members (particularly relatively thin members) during the joining process; and c) enabling the use of joining processes that otherwise would not be feasible.

Figure 6:
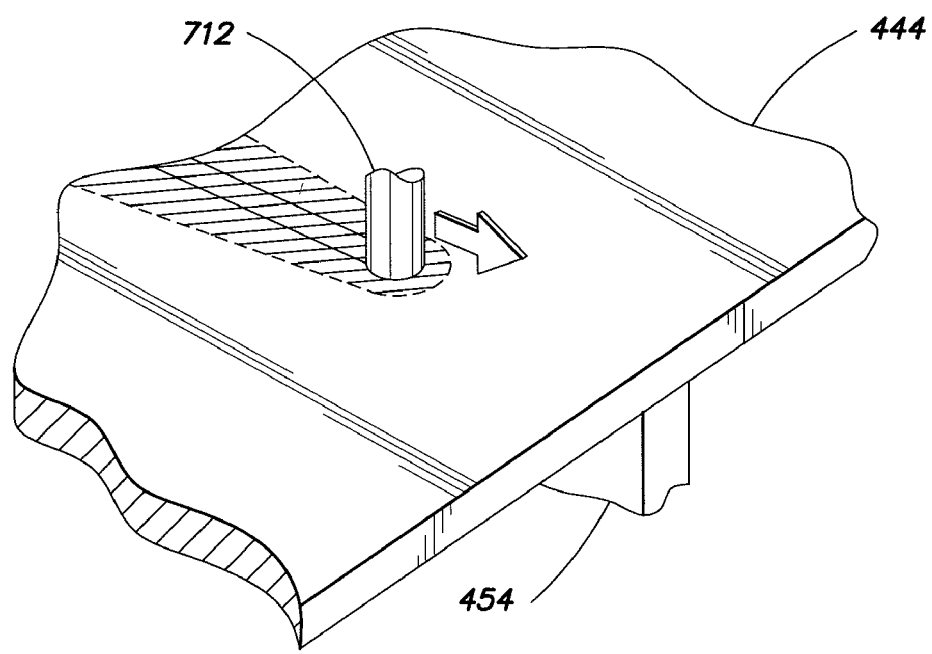
FIG. 6 illustrates an example of an attachment process for attaching the first and second airfoil portions that can be used with the exemplary disclosure.

Now referring to FIG. 6, friction stir welding, as known in the art, is a process that uses a rotating tool 712 to join two work pieces or to repair cracks in a single work piece. The rotating tool 712 is contacted with the workpiece 444 in a manner that produces frictional heating in an amount sufficient to weld the workpieces 444, 454 together. Because the process relies upon friction, some amount of force is applied to the workpieces 444, 454, which force can cause undesirable deformation of the workpieces to be joined. Friction stir welding is a well known process and further details are not necessary to provide an enabling disclosure. As indicated above, the exemplary method is not limited to using friction stir welding as a process for attaching the first and second airfoil portions 230A, 230B together.

Block 540 represents the step of removing the support material from the now joined first and second airfoil portions 230A, 230B. As indicated above, if the support material 600 is a ceramic type material, certain acids may be used to erode the ceramic disposed within the at least one internal cavity 250, and permit the erosion products to pass out of the internal cavity 250, and subsequently out of the airfoil 30 via the exterior port 256. Similarly, if the support material 600 is a low-melt metallic alloy, the support material 600 may be removed from the airfoil 30 by heating the airfoil and contained low-melt alloy support material 600 to a temperature in a range above the melt point of the support material 600 and below a temperature detrimental to the airfoil 30 material. Once the low-melt alloy support material is liquefied, it can be removed from the airfoil 30 through the exterior port 256.

While various embodiments of the method for providing internal support during friction stir welding have been described, it will be apparent to those of ordinary skill in the art that many more embodiments and implementations are possible within the scope of the method. Accordingly, the method is not to be restricted except in light of the attached claims and their equivalents.

What is claimed is:

1. A method for manufacturing a hollow airfoil, comprising the steps of:
   providing a first airfoil portion, which first portion has a wall with an interior surface and an exterior surface, and one or more ribs extending out from the interior surface;
   providing a second airfoil portion having a wall with an interior surface and an exterior surface;
   wherein the first airfoil portion and the second airfoil portion have mating geometries in which the one or more ribs extend between the interior surfaces of the walls of the first and second airfoil portion to form at least one internal cavity defined by the interior surface of the first portion wall, one or more of the ribs, and the interior surface of the second portion wall, and wherein the airfoil includes at least one exterior port disposed in one of the first airfoil portion or the second airfoil portion, or is formed between the first and second airfoil portions, which at least one exterior port is in fluid communication with the at least one cavity;
   disposing a support material within the at least one internal cavity allowing the support material to be in contact with the one or more ribs, which support material is operative to structurally support the one or more ribs;
   attaching the first and second airfoil portions together; and
   removing the support material from the at least one internal cavity through the at least one exterior port.

2. The method of claim 1, wherein disposing the support material comprises providing a ceramic material.

3. The method of claim 2, wherein providing the ceramic material includes providing at least one of fused silica, alumina, and silica-aluminosilicate.

4. The method of claim 2, wherein removing the support material comprises eroding the ceramic material, and passing the ceramic material out of the airfoil through the exterior port.

5. The method of claim 1, wherein the first and second airfoil portions comprise aluminum.

6. The method of claim 1, wherein the first and second airfoil portions comprise a weldable alloy.

7. The method of claim 6, wherein the weldable alloy is an aluminum alloy.

8. The method of claim 1, wherein disposing the support material comprises at least partially filling the at least one internal cavity with the support material.

9. The method of claim 1, wherein attaching the first and second airfoil portions together comprises friction stir welding.

10. The method of claim 1, wherein disposing the support material comprises providing a material having a melting point temperature lower than a melting point temperature of the first and second airfoil portions.

11. The method of claim 10, wherein providing the material comprises providing a metal alloy.

12. The method of claim 10, wherein removing the support material comprises elevating the support material to a temperature at or above the melting point temperature of the support material, and draining a resultant liquefied support material through the exterior port.

13. A hollow airfoil, comprising:
- a first airfoil portion, which first portion has a wall with an interior surface and an exterior surface, and one or more ribs extending out from the interior surface;
- a second airfoil portion having a wall with an interior surface and an exterior surface, attached to the first airfoil portion;
- wherein the first airfoil portion and the second airfoil portion have mating geometries in which the one or more ribs extend between the interior surfaces of the walls of the first and second airfoil portion to form at least one internal cavity defined by the interior surface of the first portion wall, one or more of the ribs, and the interior surface of the second portion wall, and wherein the airfoil includes at least one exterior port disposed in one of the first airfoil portion or the second airfoil portion, or is formed between the first and second airfoil portions, which at least one exterior port is in fluid communication with the at least one cavity; and
- a support material disposed within the at least one internal cavity in contact with the one or more ribs, which support material is operative to structurally support the one or more ribs.

* * * * *